United States Patent
Merensky et al.

(10) Patent No.: US 8,317,264 B2
(45) Date of Patent: Nov. 27, 2012

(54) VEHICLE SEAT

(75) Inventors: Harald Merensky, Hamburg (DE); Stefan Kahabka, Oppenheim (DE); Andrew Muirhead, Norderstedt (DE)

(73) Assignee: Lufthansa Technick AG, Hamburg (DE)

( * ) Notice: Subject to any disclaimer, the term of this patent is extended or adjusted under 35 U.S.C. 154(b) by 64 days.

(21) Appl. No.: 12/696,565

(22) Filed: Jan. 29, 2010

(65) Prior Publication Data
US 2010/0201166 A1 Aug. 12, 2010

(30) Foreign Application Priority Data
Jan. 30, 2009 (DE) .......... 10 2009 006 758

(51) Int. Cl.
*A47C 31/00* (2006.01)
(52) U.S. Cl. .......... 297/217.3; 297/217.1; 244/118.8; 244/118.6
(58) Field of Classification Search .......... 297/217.3, 297/217.1; 244/118.8, 118.6
See application file for complete search history.

(56) References Cited

U.S. PATENT DOCUMENTS

| | | | | |
|---|---|---|---|---|
| 4,867,235 A * | 9/1989 | Grapes et al. | .......... | 165/185 |
| 5,409,186 A * | 4/1995 | Chow | .......... | 244/122 R |
| 5,984,415 A * | 11/1999 | Schumacher et al. | ..... | 297/411.2 |
| 6,179,381 B1 * | 1/2001 | Gevaert | .......... | 297/217.3 |
| 6,824,104 B2 * | 11/2004 | Smallhorn | .......... | 244/118.5 |
| 6,824,213 B2 * | 11/2004 | Skelly et al. | .......... | 297/217.3 |
| 7,143,978 B2 * | 12/2006 | Smallhorn | .......... | 244/118.5 |
| 7,354,019 B2 * | 4/2008 | Bauer | .......... | 244/118.6 |
| 7,505,267 B2 * | 3/2009 | Sarno et al. | .......... | 361/700 |
| 2004/0183346 A1 * | 9/2004 | Sanford et al. | .......... | 297/217.3 |
| 2004/0212228 A1 | 10/2004 | Skelly et al. | | |

* cited by examiner

Primary Examiner — Laurie Cranmer
(74) Attorney, Agent, or Firm — Casimir Jones, S.C.

(57) ABSTRACT

The invention relates to a seat for a means of transport, having a supporting structure (1, 2, 3, 4), on which seating surface (5) and backrest (6) are mounted, and having a seat crossbeam (3, 4) of hollow design. The invention provides for the cavity of the seat crossbeam (3, 4) to contain electrical and/or electronic components (7).

11 Claims, 5 Drawing Sheets

VEHICLE SEAT

Figure 1:
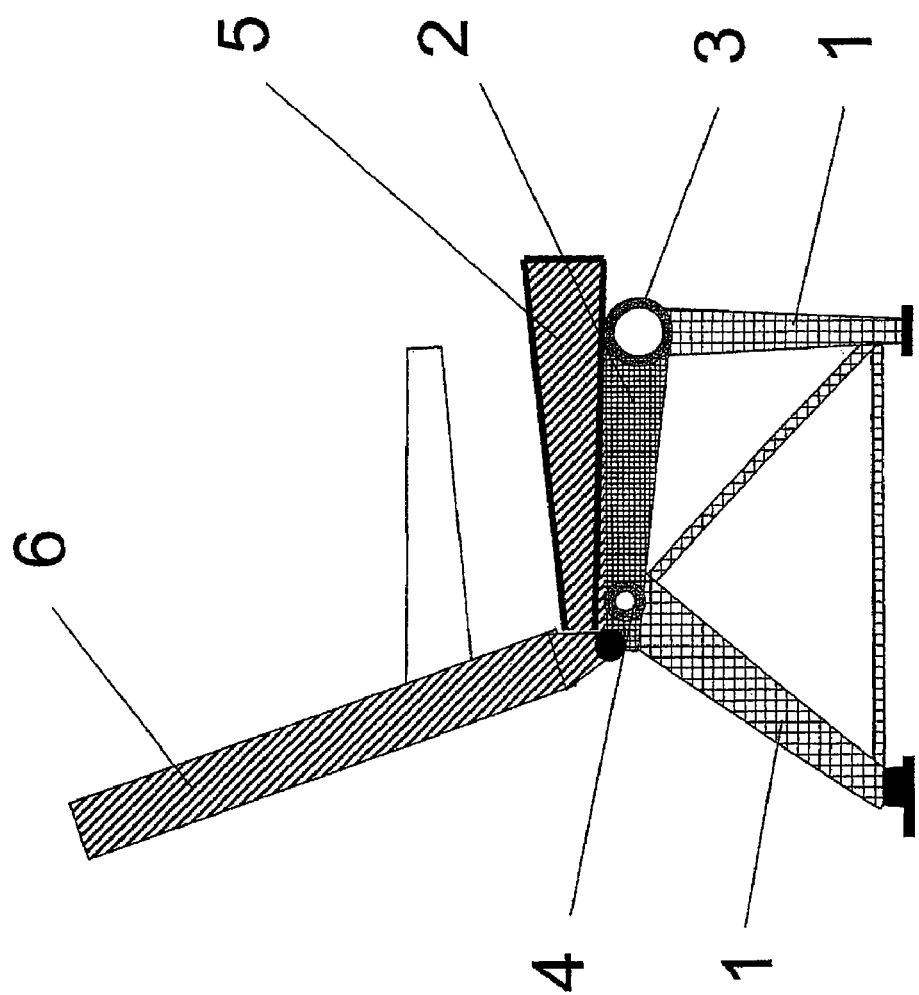

This application claims the benefit of German Patent Application No.: 102009006758.2, filed Jan. 30, 2009, which is incorporated herein by reference in its entirety.

The invention relates to a seat for a means of transport, having a supporting structure, on which seating surface and backrest are mounted, and having a seating crossbeam of hollow design.

In means of transport such as buses, trains and particularly airplanes, an increasingly sophisticated range of video and/or audio entertainment, in particular, is provided for the passengers. In this case, a range which can be personalized by the passenger for each individual seat has to a large extent developed into the standard. This "audio on demand" or "video on demand" requires control electronics associated with the seat. In addition, passengers are increasingly being provided with an infrastructure for the use of computers and PDAs (Personal Digital Assistants), which infrastructure may comprise particularly a power supply and/or wired or wireless network access points. The control of the seat and/or of the seat environment (illumination, air-conditioning etc.) also requires the arrangement of the relevant electrical and/or electronic components.

The invention is based on the object of providing a seat of the type cited at the outset which combines an appropriate level of functionality for what is known as the entertainment and/or an infrastructure for electronic appliances of the passenger with good seat comfort.

The invention achieves this object by virtue of the cavity of the seat crossbeam containing electrical and/or electronic components.

First of all, a few terms which are used within the context of the invention will be explained. A means of transport is preferably public means of transport such as airplanes, rail vehicles or buses. The supporting structure of a seat is those elements which lend the seat stability and dissipate the load into the substratum (in most cases the floor of the means of transport). By way of example, the supporting structure of a current aircraft seat has seat legs, what are known as seat dividers and also seat crossbeams. The seat legs are fitted on the cabin floor. The seat dividers are supporting elements which run in the longitudinal direction in the direction of view of a passenger sitting in the seat and which connect the upper end regions of the seat legs to one another and have the seating surfaces fitted to them and the backrests articulated to them. The seat crossbeam is a transversely running connecting element by means of which the seat dividers and seat legs are connected among one another or to one another. Customary seat crossbeams are usually hollow and are therefore suitable for accommodating the electrical and/or electronic components in accordance with the invention. Normally, a seat crossbeam is produced from metal, such as aluminum, the seat crossbeams comprising carbon fiber material or other fiber-reinforced polymers are likewise capable of being used. In the invention, this unused—in the prior art—volume of the hollow seat crossbeam is used for accommodating the electrical and/or electronic components or portions thereof (for example components for supplying power and distributing audio, video and network data). The invention therefore has a seat crossbeam of hollow design, the cavity of which can have at least one portion of the electrical and/or electronic components introduced into it.

Within the context of the invention, the cavity (as in the case of cylindrical cavities, for example) may be closed all around in the radial direction and may have openings only at the axial ends; alternatively, it may be a semi-open cavity, such as a cavity which is U-shaped in cross section, in the seat crossbeam. In line with the invention, a seat crossbeam may have two or more cavities which are physically separate from one another and which can be used, within the context of the invention, entirely or partly for holding electrical and/or electronic components.

The invention has recognized that cavities in the seat crossbeam can advantageously be used to accommodate the electrical and/or electronic components. This achieves two important advantages. First, the components are accommodated in a space-saving manner without adversely affecting seat comfort in any way. Particularly in the economy class of customary long-haul airplanes, seat space and legroom are extremely tight, which means that accommodating the components in what are known as seat electronic boxes underneath a seat—which is customary in the prior art—can significantly restrict the legroom for the passengers. Secondly, accommodating the components in cavities in the seat crossbeams, which preferably essentially comprise metal, allows the components to be effectively cooled by the dissipation of heat into the preferably metal supporting structure; if appropriate, further cooling measures may additionally be provided here.

The term "electrical and/or electronic components" should be understood comprehensively and covers all components which are used, by way of example, for the supply of power, data transmission, control or the like for the seat or for the seat environment (for example illumination, air-conditioning or the like) or for electrical and/or electronic appliances which are associated with the seat or with the seat environment or which are carried by the passenger on the journey.

The components are preferably selected from the group comprising:
a) active electronic components,
b) passive electronic components,
c) components which emit heat during operation,
d) components for supplying power,
e) components for electronic data processing.

"Active" and "passive" have the customary meaning in electronics. Components which emit heat during operation have a thermal power loss which exceeds the power loss from an ordinary electrical conductor (for example from a power supply cable). Components for supplying power cover all parts and devices for forwarding, distributing and converting (for example voltage conversion) electrical power. According to the invention, these may particularly be components for supplying power for sockets (power outlet) in the seat or seat surroundings (for example in the armrest) and/or for components which are integrated in the seat and/or associated with the seat. Components for electronic data processing cover all parts and devices for forwarding, distributing and converting data streams, for example parts for wireless or wired networks, audio and/or video data or the like. Components may be associated with several of the aforementioned groups; by way of example, many network components are active parts which emit heat during operation.

According to the invention, the seat may have an associated output unit for video and/or audio signals. This output unit may be video displays or connections for headphones or the like, in particular. Association means that the relevant output unit is associated with an individual seat or possibly with a group of seats and can be actuated or influenced in another way by a passenger in said seat. By way of example, a video display which is associated with a particular seat can be folded out from an armrest of the seat, may be fitted in the backrest of the seat in front or may be arranged so as to be able to be folded out from the cabin ceiling, for example.

In this embodiment, the seat has electronic control components for actuating and/or supplying power to the output unit. This term refers to any electrical and electronic components which either transmit or process control signals from the passenger, supply voltage to an output unit from the onboard power supply, for example, or are used to reproduce a video film selected by the passenger, or an audio unit, for example, i.e. to output it to the output unit. In this case the control components can either provide the relevant video and audio signals themselves in a form stored for selection by the passenger or, following an appropriate selection by the passenger, can set up a connection to a central computer in the means of transport, for example, which central computer provides the relevant video and/or audio signals. According to the invention, this preferred embodiment involves at least one portion of the electronic control components being arranged in the cavity of the seat crossbeam.

As already outlined, the seat crossbeam with the electrical and/or electronic components situated therein and adjoining parts of the supporting structure can be used to dissipate heat. There may be additional cooling devices provided, such as cooling ribs and/or surfaces on the outside of the relevant supporting structure elements (particularly the seat crossbeams) and/or cooling openings in an outer surface of the supporting structure elements. There may also be means provided for forced ventilation of the cavity, such as fans. In the case of a hollow seat crossbeam, there may be a fan, for example, provided at one axial end of the seat crossbeam which brings about forced ventilation over the entire crossbeam length. According to the invention, heat-conducting bridges may be provided for transferring heat from the electrical and/or electronic components to the seat crossbeam and/or to the supporting structure of the seat. Such a heat-conducting bridge may be in the form of a rail (for example comprising metal) which is a good conductor of heat and which produces good surface contact with the components, on the one hand, and with surfaces of the seat crossbeam and/or of the supporting structure, on the other hand, for example. Such heat-conducting bridges can also bring about improved dissipation of heat when the seat crossbeam, the supporting structure or portions thereof comprise materials which are not such good conductors of heat, such as fiber-reinforced plastic. To improve the conduction of heat further, heat-conducting paste may be provided on the contact surface between the components and the heat-conducting bridge, for example.

In one preferred variant of the invention, the electrical and/or electronic components may be in the form of modules which can be pushed from one end of the relevant seat crossbeam into a cavity which runs essentially in the longitudinal direction of the seat crossbeam. This modular design allows efficient utilization of the cavity of seat crossbeams in what are known as seat groups, in particular. By way of example, in the economy class of airplanes, seat groups comprising two to five adjacently arranged seats are typically formed which can have a common seat crossbeam which runs in the transverse direction and which may accordingly be of considerable length. In such a seat crossbeam, a plurality of modules can be pushed in successively from one end and hence this cavity can be used to a large extent.

The ends of the modules may have electrical and/or mechanical connections by means of which they are electrically and/or mechanically connected in their installation position. By way of example, these may be plug connections by means of which it is possible to assemble two or more modules to form a mechanically and electrically connected unit. The electrical and/or mechanical connections can preferably be subjected to tensile load in the connected state in order to allow a plurality of modules to be pulled out of a seat crossbeam together. By way of example, they can be pulled out using a tool which latches in or locks on the end of a module by means of a mechanical connection, for example by means of a click connection. Hence, at least one end of at least one module preferably has a mechanical locking option using a tool which is designed to pull the module out of a seat crossbeam.

The invention may provide for the modules, when pushed in, to inevitably adopt an angular position in which the connections at the ends of the modules are oriented to suit one another. By way of example, the modules and interior of the crossbeam may have a cross section which differs from the cylindrical shape and may have an (at least partial) form fit; alternatively, guide rails may be provided which ensure a particular angular position.

The invention also relates to a seat arrangement which has two or more adjacently arranged seats according to the invention. It may have common supporting structure elements, such as the common seat crossbeam already described.

Figure 2:
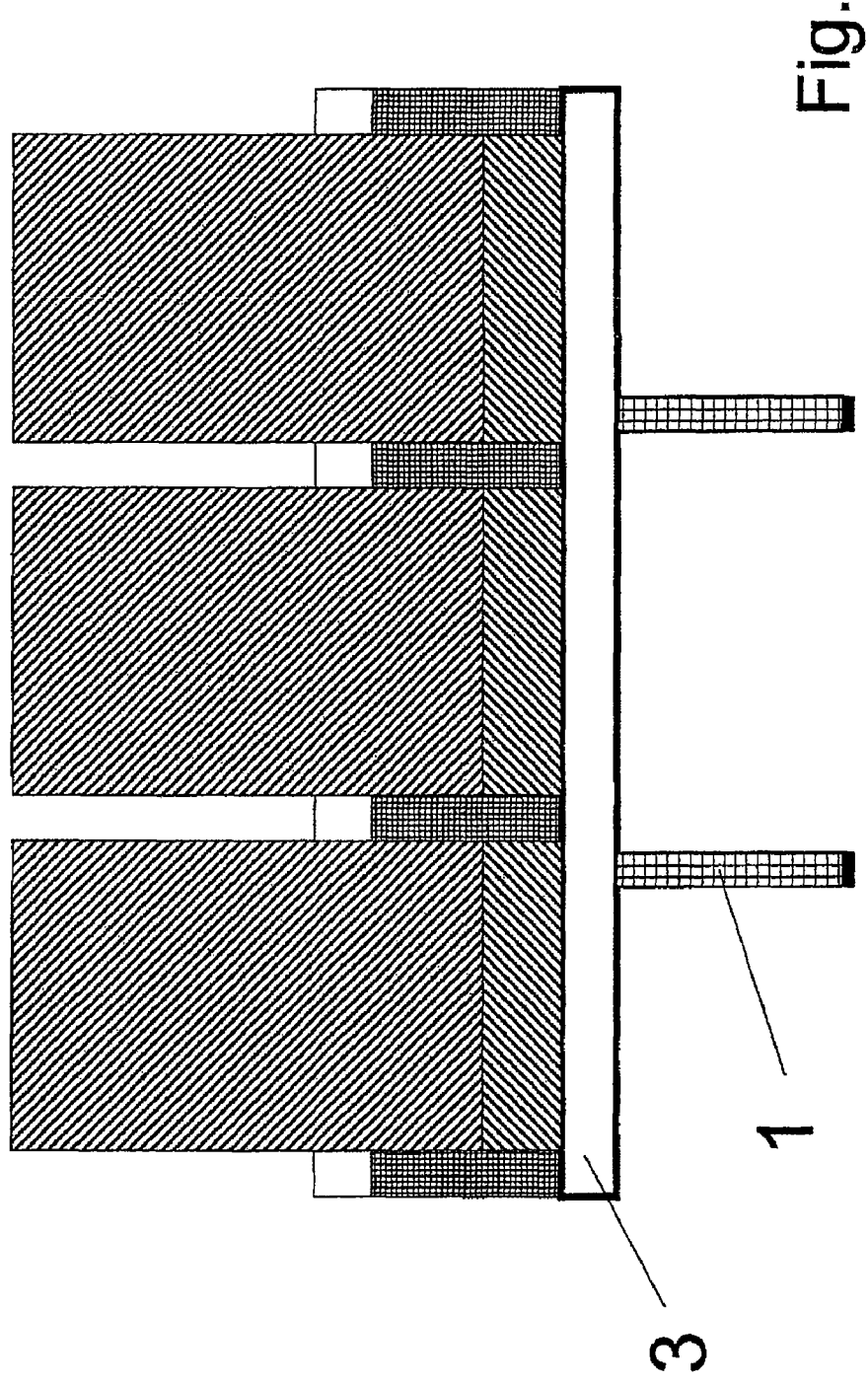
Figure 3:
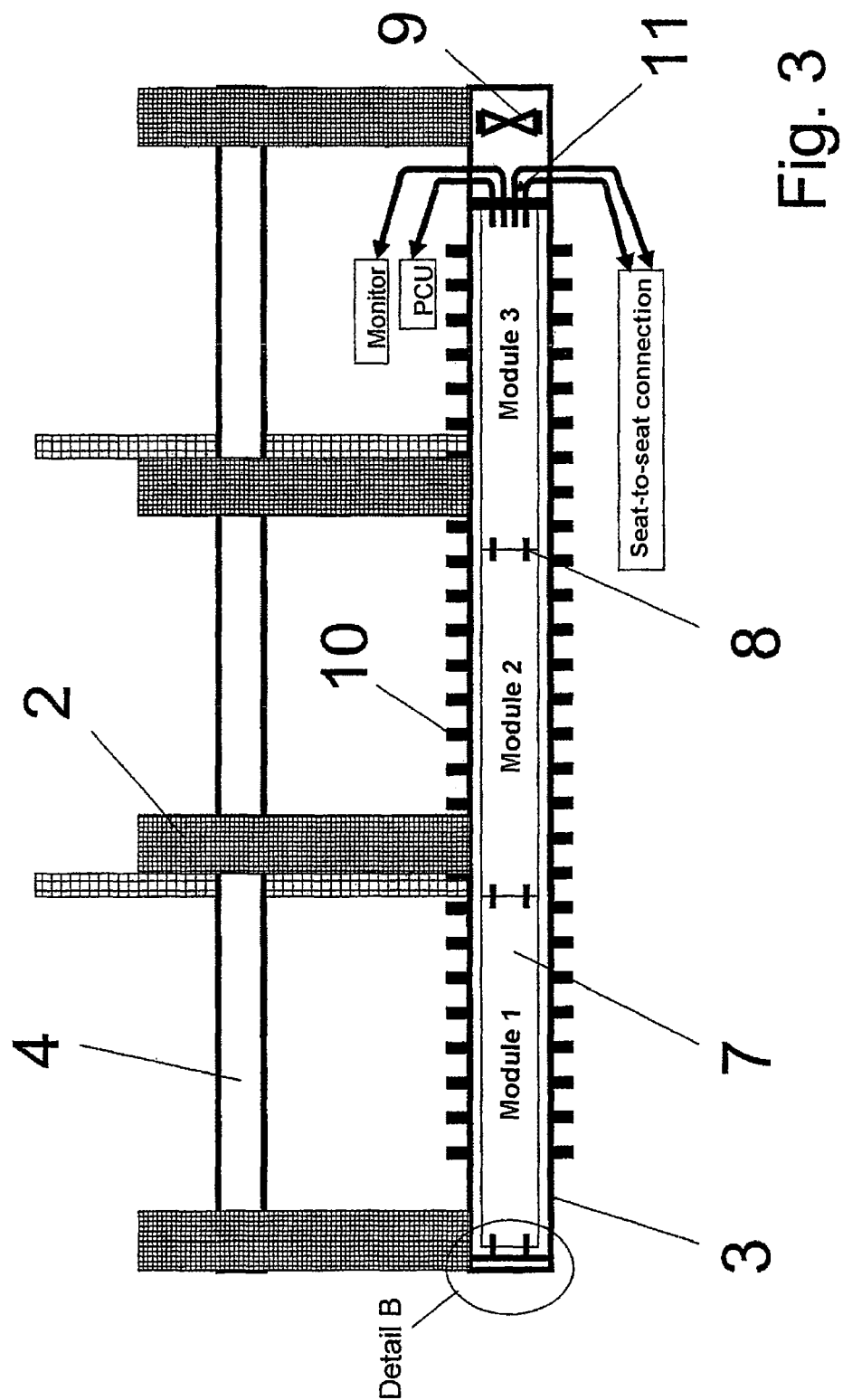
Figure 4:
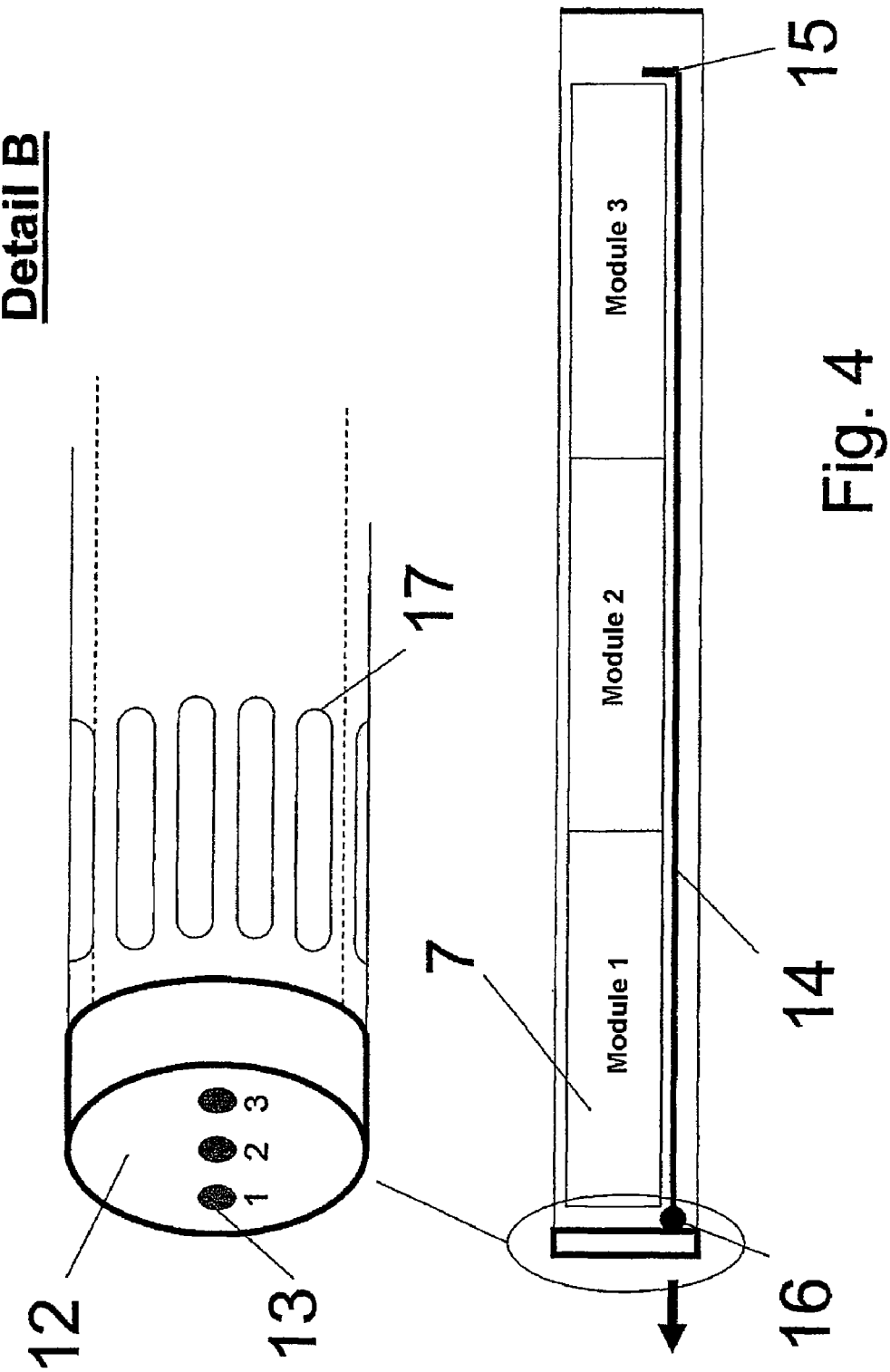
Figure 5:
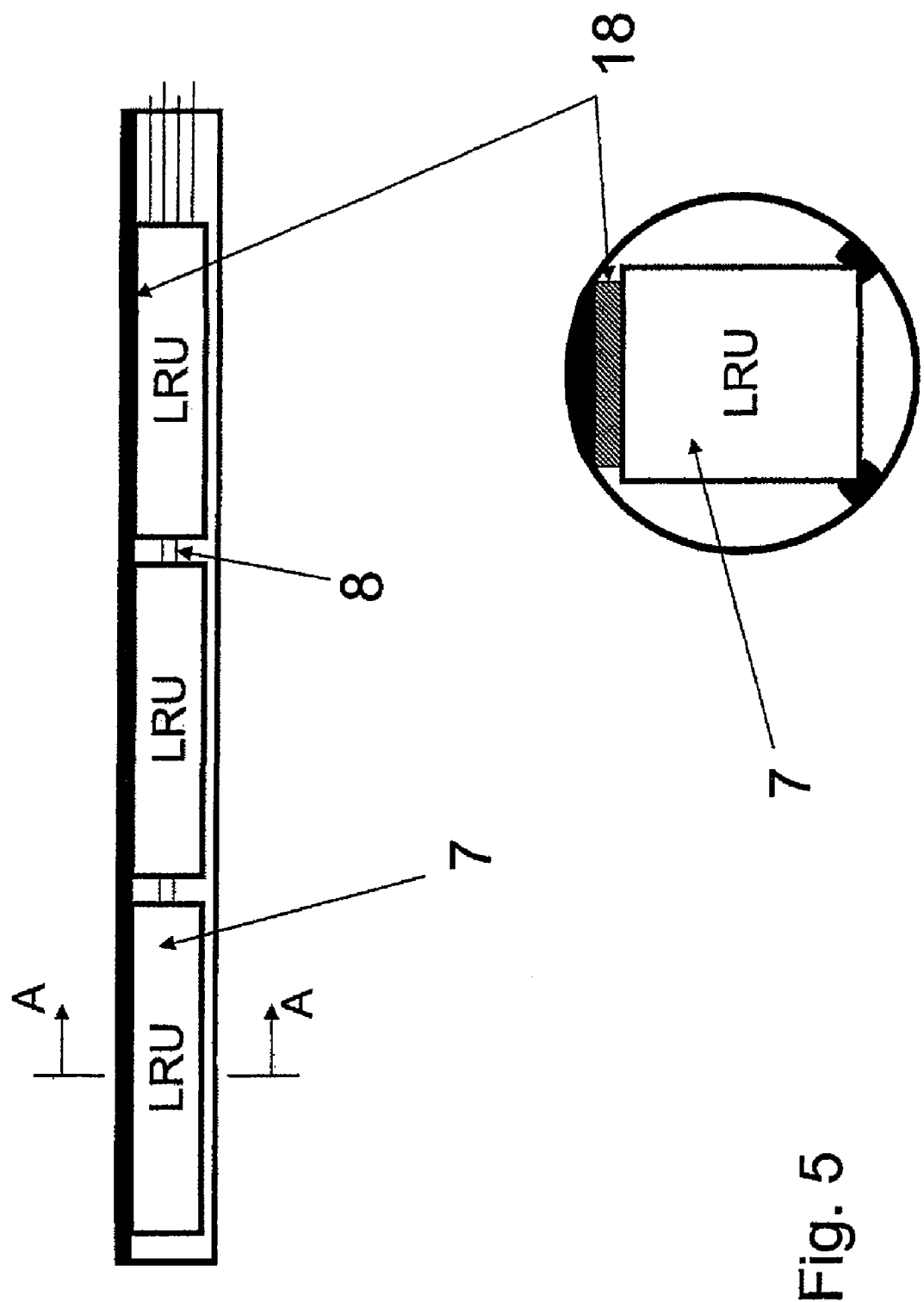

An exemplary embodiment of the invention is described below with reference to the drawings, in which:

FIG. 1: shows a partially sectional side view of a seat according to the invention;

FIG. 2: schematically shows the front view of a group of three seats;

FIG. 3: schematically shows a partially sectional plan view of the seat crossbeam with control components arranged therein;

FIG. 4: shows a detail view of the corresponding seat crossbeam;

FIG. 5: schematically shows the use of a heat-conducting bridge.

An airplane seat has seat legs 1 and seat dividers 2 running in the longitudinal direction. The cross connection between seat legs 1 and seat dividers 2 is produced by means of a front hollow main crossbeam 3 (a first seat crossbeam) and a rear hollow seat crossbeam 4. As can be seen in FIG. 2, the main crossbeam 3 extends in the transverse direction via a group of three adjacently arranged seats. The seat dividers 2 have seating surfaces 5 fitted to them and backrests 6 articulated to them.

As can be seen in FIG. 3, the cavity of the main crossbeam 3 contains three modules of electronic control components. These are essentially cylindrical modules which largely fill the cavity and whose ends are electrically and mechanically connected to one another by means of plug connections, indicated at 8. These plug connections may be click connections which latch in by being pushed together and which, following assembly, can be subjected to tensile load. Said modules bear the reference numeral 7. A fan, indicated at 9, is used for forced ventilation of the cavity in the main crossbeam 3 and hence for cooling the modules 7. In addition, the outer surfaces of the main crossbeam 3 have additional cooling ribs 10 provided on them for the purpose of improving the heat dissipation.

The electrical connections of the modules 7 are indicated at 11. At this point, particularly connections to a video display or monitor may be provided, to a control unit for the passenger (passenger control unit PCU) or to the onboard power supply system, to a central computer or possibly to a data bus line or any other wired or possibly wireless network of the means of transport.

FIG. 4 shows several details of the accommodation of the modules with electronic control components in the main crossbeam 3. The left-hand end of the main crossbeam 3 in FIG. 3 has an end cap 12 arranged on it which closes off the end of the relevant cavity of the main crossbeam 3 and which, if required, may have status indicators (for example LEDs), indicated at 13, for checking that the modules 7 are working properly. The end cap 12 may a spring device (for example a helical spring comparable to that in the case of a closure cap for the battery compartment of a torch) which points toward the end of the module 7 directly adjacent to it and which, upon closure, exerts a force acting in the axial direction of the crossbeam 3 on the modules 7 and thus aids secure assembly or secure connection.

The end cap 12 is removable, and following removal it is possible to pull the modules 7 out of the main crossbeam 3. To make it easier to pull them out, an apparatus such as a wire 14 extending over the length of the main crossbeam 3 may be provided which engages behind the entire module group at 15 and has a grip 16. Said grip 16 can be used to pull out the wire 14 with all of the modules 7, so that they can be serviced or replaced. FIG. 4 also shows ventilation slots 17 which allow the cooling air introduced into the cavity of the seat crossbeam 3 by the fan 9 to escape.

FIG. 5 shows how, particularly in the case of differing cross sections of modules 7 (for example square in this exemplary embodiment) and main crossbeam 3, the contact surface available for dissipating heat can be enlarged by means of a heat-conducting bridge 18 in the form of a rail.

The invention claimed is:

1. A seat for a means of transport, said seat having a supporting structure (1, 2, 3, 4), on which seating surface (5) and backrest (6) are mounted, and having a seat crossbeam (3, 4) of hollow design forming a cavity that runs essentially in the longitudinal direction of the seat crossbeam (3), characterized in that the cavity of the seat crossbeam (3, 4) contains electrical and/or electronic components (7), wherein the electronic components are in the form of a plurality of modules (7) that can be pushed into said cavity in said seat crossbeam (3) from one end of the relevant seat crossbeam (3) into an installed position, wherein ends of the modules (7) have electrical connections (8) thereupon, and wherein in said installed position, an end of at least one module (7) contacts an end of a second module (7) by means of which they are electrically connected in their installation position.

2. Seat according to claim 1, wherein the electrical and/or electronic components (7) are selected from the group comprising:
   a) active electronic components,
   b) passive electronic components,
   c) components which emit heat during operation,
   d) components for supplying power,
   e) components for electronic data processing.

3. Seat according to claim 1, wherein said seat has an output unit, associated with the seat, for video and/or audio signals and electronic control components (7) for actuating and/or supplying power to the output unit, wherein at least one portion of the electronic control components (7) is arranged in the cavity of the seat crossbeam (3, 4).

4. Seat according to claim 1, wherein the seat crossbeam (3, 4) with electronic components (7) arranged therein has cooling devices (9, 10, 17).

5. Seat according to claim 4, wherein the cooling devices comprise cooling ribs and/or surfaces (10) on the outside of the seat crossbeam (3) and/or cooling openings (17) in an outer surface of the seat crossbeam (3).

6. Seat according to claim 4, wherein the cooling devices comprise means (9) for forced ventilation of the cavity.

7. Seat according to claim 4, wherein heat-conducting bridges are provided for the transfer of heat from the electrical and/or electronic components (7) to the seat crossbeam (3, 4) and/or to the supporting structure of the seat.

8. Seat according to claim 1, wherein the electrical and/or mechanical connections (8) can be subjected to tensile load in the connected state in order to allow a plurality of modules (7) to be pulled out of a seat crossbeam (3) together.

9. Seat according to claim 1, wherein at least one end of at least one module (7) has a mechanical locking option using a tool which is designed to pull the module (7) out of a seat crossbeam (3).

10. Seat arrangement, wherein said seat arrangement has two or more adjacently arranged seats according to claim 1.

11. Seat arrangement according to claim 10, wherein said seat arrangement has at least one common seat crossbeam (3, 4) which extends over two or more seats.

* * * * *